US009079144B2

(12) United States Patent
Barton

(10) Patent No.: US 9,079,144 B2
(45) Date of Patent: Jul. 14, 2015

(54) HYDROGEN GENERATOR AND FUEL CELL SYSTEM

(71) Applicant: Intelligent Energy Limited, Leicestershire (GB)

(72) Inventor: Russell H. Barton, New Westminster (CA)

(73) Assignee: Intelligent Energy Limited, Loughborough (GB)

( * ) Notice: Subject to any disclaimer, the term of this patent is extended or adjusted under 35 U.S.C. 154(b) by 517 days.

(21) Appl. No.: 13/667,021

(22) Filed: Nov. 2, 2012

(65) Prior Publication Data

US 2013/0115536 A1    May 9, 2013

Related U.S. Application Data

(60) Provisional application No. 61/557,515, filed on Nov. 9, 2011.

(51) Int. Cl.
*H01M 8/06* (2006.01)
*B01J 7/00* (2006.01)
(Continued)

(52) U.S. Cl.
CPC ................. *B01J 7/00* (2013.01); *C01B 3/0005* (2013.01); *C01B 3/0084* (2013.01); *C01B 3/065* (2013.01); *F17C 11/005* (2013.01); (Continued)

(58) Field of Classification Search
CPC ....... B01J 7/00; H01M 8/0606; H01M 8/065; H01M 8/0428; H01M 8/04216
USPC .......... 429/423, 499, 416; 422/105, 199, 119, 422/129; 141/64, 19, 59
See application file for complete search history.

(56) References Cited

U.S. PATENT DOCUMENTS 4,463,063 A * 7/1984 Adlhart .................... 429/416
5,458,165 A * 10/1995 Liebmann, Jr. ............ 141/64
(Continued)

FOREIGN PATENT DOCUMENTS

GB    2469248 A    10/2010
GB    2469522 A    10/2010
(Continued)

OTHER PUBLICATIONS

Machine Translation of: JP 09050820A, Kawamura et al., Feb. 18, 1997.*
(Continued)

*Primary Examiner* — Kenneth Douyette
(74) *Attorney, Agent, or Firm* — Baker & Hostetler LLP

(57) ABSTRACT

A hydrogen generator and a fuel cell system including a fuel cell battery and the hydrogen generator. The hydrogen generator includes a cartridge including a plurality of pellets stacked within a casing, each pellet containing a hydrogen containing material capable of releasing hydrogen gas when heated; a compartment including a hydrogen outlet through a housing and as cavity within the housing within which the cartridge can be removably disposed; and an induction heating system. The induction heating system includes a plurality of secondary coils within the cartridge casing, with each secondary coil in contact with one or more of the pellets. The induction heating system also includes at least one primary coil within the compartment housing. The induction heating system provides an electromagnetic field from a flow of the current in the primary coil, induces an electric current in the secondary coil, and producing heat to heat the pellets.

19 Claims, 1 Drawing Sheet

(51) Int. Cl.
    *C01B 3/00*     (2006.01)
    *H01M 8/04*     (2006.01)
    *C01B 3/06*     (2006.01)
    *F17C 11/00*     (2006.01)

(52) U.S. Cl.
    CPC ..... *H01M 8/04208* (2013.01); *H01M 8/04216* (2013.01); *H01M 8/065* (2013.01); *H01M 8/0606* (2013.01); *Y02E 60/321* (2013.01); *Y02E 60/324* (2013.01); *Y02E 60/362* (2013.01); *Y02E 60/50* (2013.01)

(56) References Cited

U.S. PATENT DOCUMENTS

| | | |
|---|---|---|
| 7,261,748 B2 | 8/2007 | Jones et al. |
| 7,682,411 B2 | 3/2010 | Jones et al. |
| 7,998,226 B2 | 8/2011 | Galloway |
| 8,052,784 B2 | 11/2011 | Field |
| 8,084,150 B2 | 12/2011 | Otis, Jr. et al. |
| 2003/0234172 A1 | 12/2003 | Arthur et al. |
| 2010/0028748 A1 | 2/2010 | Curello et al. |
| 2010/0135899 A1 | 6/2010 | Luo et al. |
| 2010/0326992 A1 | 12/2010 | De Rango et al. |
| 2011/0033342 A1* | 2/2011 | Horiguchi et al. ............ 422/105 |

FOREIGN PATENT DOCUMENTS

| | | |
|---|---|---|
| JP | 09050820 A | 2/1997 |
| JP | 2003-206102 A | 7/2003 |
| JP | 2004-250255 A | 9/2004 |
| JP | 2005067990 A | 3/2005 |
| JP | 2006-162057 A | 6/2006 |
| JP | 2006-179276 A | 7/2006 |
| JP | 2009-007180 A | 1/2009 |

OTHER PUBLICATIONS

ISA/EPO, International Search Report and the Written Opinion of the International Searching Authority, Application No. PCT/US2012/063140, Feb. 1, 2013.

* cited by examiner

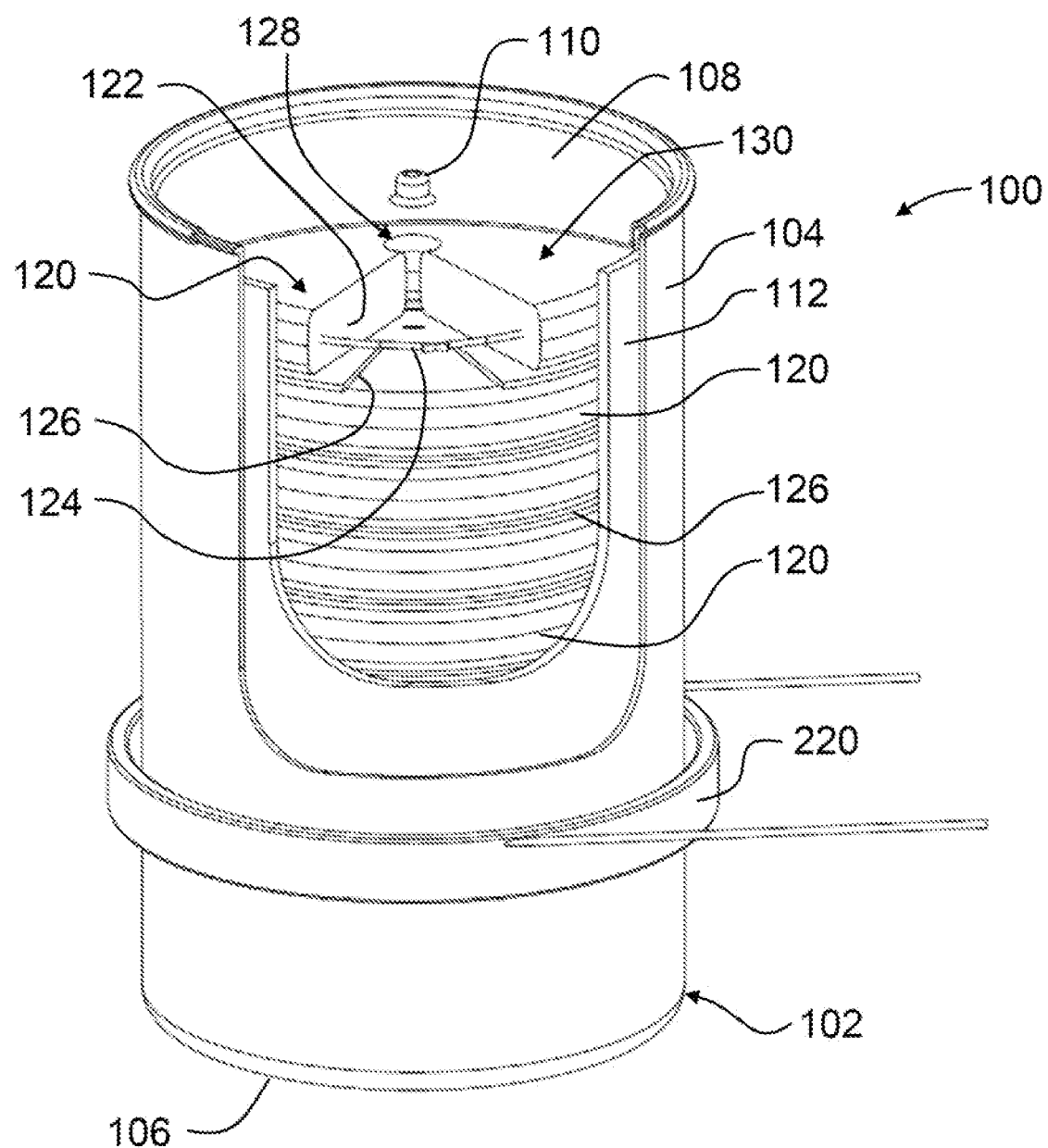

HYDROGEN GENERATOR AND FUEL CELL SYSTEM

CROSS-REFERENCE TO RELATED APPLICATIONS

This application claims the benefit of U.S. Provisional Application No. 61/557,515, filed Nov. 9, 2011, entitled Hydrogen Generator.

TECHNICAL FIELD

This invention relates to a hydrogen generator for providing hydrogen gas and a system, such as a fuel cell system, including the hydrogen generator.

BACKGROUND

Interest in fuel cell batteries as power sources for portable electronic devices has grown. A fuel cell is an electrochemical cell that uses materials from outside the cell as the active materials for the positive and negative electrode. Because a fuel cell does not have to contain all of the active materials used to generate electricity, the fuel cell can be made with a small volume relative to the amount of electrical, energy produced compared to other types of batteries.

Fuel cells can be categorized according to the type of electrolyte used, typically one of five types: proton exchange membrane fuel cell (PEMFC), alkaline fuel cell (AFC), phosphoric-acid fuel cell (PAFC), solid oxide fuel cell (SOFC) and molten carbonate fuel cell (MCFC). Each of these types of fuel cell can use hydrogen and oxygen as the active materials of the fuel cell negative electrode (anode) and positive electrode (cathode), respectively. Hydrogen is oxidized at the negative electrode, and oxygen is reduced at the positive electrode. Ions pass through an electrically nonconductive, ion permeable separator and electrons pass through an external circuit to provide an electric current.

In some types of hydrogen fuel cells, hydrogen is formed from a hydrogen-containing fuel supplied to the negative electrode side of the fuel cell. In other types of hydrogen fuel cells, hydrogen gas is supplied to the fuel cell from a source outside the fuel cell.

A fuel cell system can include a fuel cell battery, including one or more fuel cells (such as in a fuel cell stack), and a gas source, such as a gas tank or a gas generator. Gas generators that supply gas to a fuel cell can be an integral part of a fuel cell system, they can be removably coupled to the fuel cell system, or they can include replaceable components containing reactants. A removable gas generator can be replaced with another one when the gas producing reactants have been consumed, Removable gas generators can be disposable (intended for only a one-time use) or refillable (intended for use multiple times) to replace consumed reactant materials.

Hydrogen generators can produce hydrogen using a variety of hydrogen containing materials and a variety of methods for initiating the release of hydrogen therefrom. Hydrogen gas can be evolved when a hydrogen containing material reacts. Examples of hydrogen containing materials include liquid or gaseous hydrocarbons (such as methanol), hydrides (such as metal hydrides and chemical hydrides), alkali metal silicides, metal/silica gels, water, alcohols, dilute acids and organic fuels (such as N-ethylcarbazone and perhydrofluorene). A hydrogen containing compound can react with another reactant to produce hydrogen gas, when the reactants are mixed together, in the presence of a catalyst, heat or an acid, or a combination thereof.

In selecting reactants for use in a hydrogen generator, consideration may be given to the following: (a) stability during long periods of time when the hydrogen generator is not in use, (b) ease of initiation of a hydrogen generating reaction, (c) the amount of energy that must be provided to sustain the hydrogen generating reaction, (d) the maximum operating temperature of the hydrogen generating reaction, and (e) the total volume of hydrogen that can be produced per unit of volume and per unit of mass of the reactant(s).

Some hydrogen containing compounds can be heated to evolve hydrogen in a chemical decomposition reaction. A hydrogen generator using such types of reactants can be advantageous with regard to the volume of hydrogen that can be produced compared to other types of hydrogen generators such as those with a liquid reactant.

An object of the present invention is to provide a hydrogen generator with one or more of the following features: inexpensive and easy to manufacture, safe to store and use, good energy efficiency, able to produce a large total volume of hydrogen gas per unit of mass and per unit of volume of the hydrogen generator, able to control the supply of hydrogen on an as needed basis, able to quickly start and stop producing hydrogen, able to operate at or below a desired maximum temperature, at least a portion of the hydrogen generator in a fuel cell system can be replaced after hydrogen containing materials have been consumed, and durable and reliable for a long period of time.

SUMMARY

In one aspect of the invention, there is provided a hydrogen generator including a cartridge including a casing and a plurality of solid pellets stacked within the casing, each pellet containing at least one hydrogen containing material capable of releasing hydrogen gas when heated; a compartment including a housing, a hydrogen outlet through the housing and a cavity within the housing within which the cartridge can be removably disposed; and an induction heating system. The induction heating system includes a plurality of secondary coils within the cartridge casing, with each secondary coil in contact with one or more of the pellets. The induction heating system also includes at least one primary coil within the compartment housing. The induction heating system is configured to receive an electric current from a power source, provide an electromagnetic field from a flow of the current in the at least one electrically conductive primary coil, induce an electric current in the at least one electrically conductive secondary coil, and provide heat from a flow of the induced electric current; thereby heating the pellets. Embodiments can include one or more of the following features:

the cartridge has a sealed casing with a hydrogen outlet valve;
  the cartridge has a cylindrical shape;
  the cartridge has a prismatic shape;
  the pellets are arranged in multiple layers, each layer containing a single pellet;
  each pellet is in contact with a secondary coil; each pellet can be in contact with a separate secondary coil; more than one pellet can be in contact with the same secondary coil;
  the at least one secondary coil is in contact with a pellet surface;
  the at least one secondary coil is disposed at least partially within a pellet;
  the induction heating system includes a moveable primary coil;

the induction heating system includes a plurality of primary coils; the primary coils can be adjacent to, on or at least partially recessed in an inner surface of the compartment housing;

the pellets are segregated pellets, with adjacent pellets separated from each other; a thermally insulating material can be disposed between adjacent pellets;

the cartridge includes means for maintaining contact between the solid compositions and the secondary coils;

the cartridge includes means for maintaining alignment between the secondary coils and the primary coils as the heat generator is being used;

the cartridge includes a hydrogen flow path extending from the pellets through the cartridge casing;

the hydrogen flow path includes a channel extending through and/or around the pellets; the hydrogen flow path can include a central channel; the hydrogen flow path can include more than one channel;

at least one filter is disposed in the hydrogen flow path;

the cartridge includes a foil seal over the hydrogen outlet valve prior to insertion of the cartridge into the compartment; the foil seal can be broken upon insertion of the cartridge into the compartment;

the hydrogen generator uses no liquid reactants;

the cartridge includes no catalyst;

the at least one hydrogen containing material undergoes a thermal decomposition when heated to at least a minimum temperature, thereby releasing hydrogen gas;

the at least one hydrogen containing material is selected from the group consisting of a material that can absorb and desorb hydrogen and a material that can react to produce hydrogen gas upon thermal decomposition; and the pellets further include an ignition material, preferably at least one material capable of reacting exothermically selected from the group consisting of metal/metal oxide multilayers, a metal/metal multilayered thin film, an autoignition composition, a gel of a metal and water, and a gel of metal and water in combination with sodium borohydride.

In another aspect of the invention, there is provided a fuel cell system including a fuel cell battery and the hydrogen generator as described above. Embodiments can include one or more of the following features:

a portion of the induction heating system is in the fuel cell system outside the hydrogen generator.

the induction heating system is configured to monitor at least one of temperature and pressure and selectively heat one or more pellets to provide hydrogen as needed by the fuel cell battery.

Unless otherwise specified herein, all disclosed characteristics and ranges are as determined at room temperature.

BRIEF DESCRIPTION OF THE DRAWINGS

In the drawings:

FIG. 1 is a cross sectional view of a portion of a hydrogen generator cartridge.

DETAILED DESCRIPTION

The hydrogen generator releases hydrogen gas. The hydrogen gas can be used by a hydrogen consuming system, such as one including a fuel cell battery that produces electricity for an electronic device. The hydrogen generator includes a compartment into which a replaceable cartridge can be removably inserted. It is generally desirable to include reusable components in the compartment or elsewhere in the system outside the cartridge. In this way the hydrogen generator can be reused at a minimal added expense by replacing the cartridge in which hydrogen containing material is contained. The cartridge can be disposed of after use, it can be reused by refilling it with fresh materials, or it can be recycled. The size and shape of the cartridge and the compartment can be varied depending on the circumstances. For example, the cartridge can have a generally cylindrical shape, or it can have a generally prismatic shape.

The cartridge can have a closed casing to contain hydrogen containing materials and byproducts. It can have a sealed casing to protect the contents from water, air and so on. If the casing is sealed, means of releasing hydrogen gas is provided (e.g., a valve or a water impermeable, hydrogen permeable membrane). One or more hydrogen containing materials are contained in a solid composition that is disposed in multiple solid bodies. The solid bodies are stacked within the casing. A single solid body can be in each layer of the stack. The hydrogen containing material in the solid composition contains elemental hydrogen that is released as hydrogen gas when a pellet is heated sufficiently. The solid composition is heated by induction heating. Each solid body has at least one secondary coil that heats the solid composition therein, thereby causing a release of hydrogen gas. The hydrogen gas can travel to a hydrogen outlet valve in the casing.

In an embodiment the cartridge casing has a cylindrical side wall and two lids closing the ends of the cylindrical side wall, the two lids being secured to the side wall with a beverage can type closure.

The compartment includes a housing defining a cavity in which the cartridge can be inserted. The compartment can be closed or kept open when the hydrogen generator is in use. Within the housing are one or more primary coils. The primary and secondary coils are part of an induction heating system. Electric current flowing through the primary coil creates an electromagnetic field that induces a flow of current in a secondary coil(s). The induced current generates heat in the secondary coil that heats the solid body with which it is in contact. The primary coil is a component of the compartment and can be reused when expended cartridges are replaced. Electric current is provided to the induction heating system by a power source that can be a component of the compartment or can be located outside the hydrogen generator (e.g., as a component of a system, such as a fuel cell system, or an electronic device being powered by the system).

In an embodiment, the compartment housing can be a cylindrical housing with a side wall, a first lid secured to the side wall with a beverage can type closure, and a second lid that is removable for inserting and removing cartridges.

The solid bodies containing the hydrogen containing material can be in various forms, such as pellets, tablets, wafers, cakes, briquettes, coatings, and so on. Hydrogen containing materials and optional components of the solid composition are described below. The solid bodies can have various shapes, such as circles, ovals, squares, rectangles, trapezoids, wedges, irregular shapes, and so on. The solid bodies can be made using a suitable process, such as molding, extruding, depositing, briquetting, coating, printing, and so on. As used herein, the term "pellet" refers to a solid body containing the hydrogen containing material, and is not limited to a particular form, shape or method of manufacture unless otherwise stated. The pellets can be sized and shaped to fit into the cartridge casing in a volume-efficient manner. The pellet size and composition can be chosen to provide a desired quantity of hydrogen from each pellet, based on the rate at which hydrogen is to be supplied or, in the case of exothermic reactions, how quickly hydrogen generation is to be stopped.

Each pellet is in contact with at least one secondary coil. The secondary coil can be disposed on a surface of the pellet, or it can be at least partially disposed within the solid composition. Each pellet can be heated by a single secondary coil, more than one secondary coil can be used to heat a single pellet, or one than one pellet can be heated by one secondary coil. For example, one secondary coil can be disposed on a bottom surface of the pellet and another secondary coil can be disposed on a top surface or within the pellet, two or more secondary coils can be disposed within the pellet, and so on. One secondary coil may be used to heat more than one pellet (e.g., by disposing the secondary coil between and in contact with adjacent pellets), if it is desirable to heat more than one pellet at one time.

The primary coil(s) can be disposed adjacent to, on or at least partially recessed in an inner surface of the compartment housing. A single primary coil can be moved so that it can selectively induce current flow in the secondary coil(s) with which it is aligned. Alternatively, multiple stationary primary coils can be positioned within the compartment so it can induce current flow with one or more secondary coils, or a combination of moving and stationary coils can be used. Using multiple coils can avoid the need for a mechanism for moving the primary coil.

The pellets are advantageously stacked within the cartridge, to facilitate initiation of the hydrogen generating reaction in selected pellets to provide hydrogen gas on an as-needed basis.

The cartridge casing can include one or more side walls, a bottom wall and a top wall for example. It can be in the form of a round or prismatic can. The top or bottom wall can be an integral part of the can; one or both of the top and bottom walls can be sealed to the side wall(s) in any suitable manner (e.g., with an adhesive, by ultrasonic welding, and so on). The casing can be sealed to be gas tight. It is made of a material that will withstand the heat produced therein. The casing can be made of as material that is not electrically conductive in order to prevent eddy current heating that can reduce the system efficiency. A poor electrical conductor preferably has an electrical conductivity at 293°K of less than $10^{-10}$ ohm$^{-1}$·m$^{-1}$. The casing material can be a poor thermal conductor, which can help retain the heat generated within the hydrogen generator where it is needed to provide good energy efficiency, avoid heat damage to components of the compartment, and protect the user from being burned when removing a cartridge from the compartment. Preferably a poor conductor of heat will have a thermal conductivity less than 10 watts/(meter·Kelvin), more preferably less than 1 watt/(meter·Kelvin). The casing can be at least partially lined with thermal insulation if desired, to provide improved efficiency and prevent the exterior surfaces of the casing from getting too hot. Examples of materials that are resistant to high temperature, and have both poor electrical and thermal conductivity include polyoxybenzylmethylenglycol anhydride (Bakelite®), polyetheretherketone and polyetherimide.

The compartment housing will be made of a material that will withstand the temperatures to which it will be exposed. It can be made from an electrically conductive material or, preferably, an electrically nonconductive material. If an electrically conductive material such as a conductive metal is desired (e.g., for strength), the inner surface of the metal can be lined or coated with an electrically nonconductive material. An electrically nonconductive compartment housing will not interfere with production of an electromagnetic field by the primary coil or make control of current induction in selected secondary coils difficult. The housing can be made from a material that is a poor thermal conductor. This can avoid heat damage to portions of the system located adjacent to the exterior of the hydrogen generator. Examples of materials that are resistant to high temperature, and have both poor electrical and thermal conductivity include polyoxybenzylmethylenglycol anhydride (Bakelite®), polyetheretherketone and polyetherimide.

The primary coil is made from an electrically conductive material. It can be a single-turn or multi-turn coil extending around the entire inside of the compartment housing. It can be in the form of a hollow tube or one or more turns of wire (e.g., a helical coil). Preferably the primary coil includes many coils of wire, in order to maximize voltage and reduce the current in the primary coil and minimize heat generation, ohmic losses and semiconductor switching losses in the primary coil. The coil is preferably in a plane that is generally parallel to a plane of the pellet layer(s) to be heated. Materials used for electric motor or transformer coils are generally suitable, such as copper, aluminum iron and alloys thereof. If wire is used, it can be wound on a non-metallic bobbin. A resin, such as a resin suitable for electric motor or transformer coil impregnation, can be used to bond the coil.

The secondary coil is made from an electrically conductive material, preferably a metal such as copper, aluminum, iron and alloys thereof. It can be in the form of a hollow tube, a closed loop, or a single-turn or multi-turn coil in contact with a pellet. It can be sized to optimize heating of the pellet. It can be in the form of a tube or one or more turns of wire. The coil is preferably in a plane that is generally parallel to a plane of the pellet layer and is generally parallel to the plane of the primary coil. It is desirable that the coil material be stable while in contact with the solid composition of the pellet and not react, especially to produce undesirable contaminants. The coil can be coated to protect it. It may also be desirable to coat the coil with an electrically nonconductive material if the pellet reaction products are electrically conductive. If the reaction products are electrically nonconductive, an uncoated coil is preferred to provide the maximum thermal conductivity to the solid composition of the pellet.

The power source for the induction heating system can be a battery, fuel cell or other source of electrical energy within hydrogen generator, elsewhere in the system, or even outside the system (e.g., within a device being supplied with power from a fuel cell battery in the system). The induction heating system uses AC current in the primary coil. If the power source is a DC source, an inverter can be used to supply a single phase alternating current at the desired frequency. A suitable power range for the power source may be from about 5 to about 20 watts. For user-replaceable cartridges, a suitable drive frequency for the primary coil may be within the range of about 10 to about 75 KHz.

Though both an induction heating system and a dielectric heating system (such as a microwave or radio frequency dielectric heating system) can produce a rapidly oscillating electromagnetic field, an induction heating system induces current in an electrically conductive secondary coil, while a dielectric heating system produces molecular rotation in dielectric materials containing polar molecules to generate heat. An induction heating system can be advantageous. For example, in cartridges using reactants that become electrically conductive when they react, an inductive heating system can provide a more targeted transfer of energy to the secondary coil, without the risk of burning the user. A magnetic field is small, with little loss and a lower risk of RF interference than with a dielectric heating system.

It may be desirable to react more than one pellet at a time in order to generate hydrogen more rapidly. However, in order to prevent the uncontrolled initiation of reactions in adjacent pellets it is desirable for individual pellets or groups of pellets to be thermally insulated from one another. This can be accomplished in various ways, including spacing pellet layers apart from each other, separating pellet layers with layers of thermally insulating material, applying thermal insulation to external surfaces of the pellets, and so on. Suitable thermal insulator materials include silica, silicon dioxide, silicon nitrides, silicon carbide, silica aerogel, alumina, alumina oxide, glass, glass wool, mineral wool, cellular glass, perlite, and polymers such as polyimides and epoxy-amine composites.

One or more hydrogen containing materials, which can be referred to as fuel, are contained in a solid composition that can react to release hydrogen gas when heated. Examples include materials that can reversibly absorb and desorb hydrogen (e.g., metal-organic frameworks (MOFs), zeolites, graphene, carbon nanotubes and metal hydrides as $AB_5$ and $AB_2$ type hydrogen storage alloys such as titanium-manganese, mischmetal-nickel, lanthanum-nickel-cobalt and lanthanum-nickel alloys), materials that can react to produce hydrogen gas upon thermal decomposition (e.g., metal hydrides such as lithium hydride, magnesium hydride, and aluminum hydride (alane), complex hydrides and their ammonia adducts such as lithium borohydride, sodium borohydride, magnesium borohydride, calcium borohydride, ammine titanium (III) borohydride, lithium aluminum hydride, sodium aluminum hydride, lithium amide, and calcium aluminum hydride, and B—N chemical hydrides such ammonia borane and hydrazine borane) and various combinations including the above materials.

The pellets can contain one or more additives. Examples of additives include binders (e.g., acrylates and styrene block copolymers), stabilizing compounds (e.g., solid bases), reaction accelerators (e.g., solid acids), catalysts (e.g., $Fe_2O_3$, $TiCl_3$), ignition materials (described below), thermally conductive materials (e.g., metals, graphites and composites thereof), and so on.

To minimize cost and maximize the amount of solid composition in the pellets it may be desirable that the pellet does not include a catalyst material.

The induction heating system can be the sole means of applying heat to the hydrogen containing material, or an ignition material (a material that will react exothermally, producing heat to initiate the release of hydrogen gas from the hydrogen containing material) can be included in the pellet, such as in a mixture with the hydrogen containing material or as a separate layer or portion of the pellet. If the release of hydrogen from the hydrogen containing material generates heat, it may be possible to reduce or stop applying heat after the release is initiated. An ignition material can be used to supplement or replace the application of more heat by the heating elements, thereby reducing the amount of energy consumed by the hydrogen generator. Examples of ignition materials (some of which can also contribute to the hydrogen yield) include metal/metal oxide multilayers such as $Ti/Pb_3O_4$, $Zr/Fe_2O_3$, guanidinium borohydride, B—N compounds blended with oxidizers such as ammonium nitrate or $Sr(NO_3)_2$ as described in US2011/0027168A1, metal/metal multilayered thin films and structures such as Ni/Al as described in U.S. Pat. No. 7,867,441, autoignition compositions such as silver nitrate mixed with potassium nitrate and molybdenum metal as described in U.S. Pat. No. 6,749,702, complex hydride, oxidizer, and S compositions such as described in U.S. Pat. No. 7,964,111, and the compositions described in patents US2008/0236032A1 and US 200810241613A1. Other compositions include gels of metals and water such as Mg/water/poly(acrylamide-co-acrylic acid) alone or in combination with sodium borohydride (Varma, et al. *Chem. Eng. Sci* 2010, 65, 80-87 and *Int. J. Hydrogen En* 2007, 32, 207-211, respectively).

It may be desirable to include means for maintaining good contact between the solid composition and the secondary coils while the hydrogen generator is being used, particularly if the density of the solid composition changes as materials react. It may be desirable to include means for maintaining alignment between the primary and secondary coils in mused pellets and as the hydrogen generator is used. Biasing elements, such as compression pads and springs, may be useful for these purposes.

When the cartridge is inserted into the compartment it must be positioned so the primary coils are properly aligned with the secondary coils. It may be desirable to control the sequence of heating individual pellets to minimize the effects of heated pellets on the unused pellets in the cartridge. It may be desirable to space the primary coils in the compartment to allow for movement of unused pellets as the hydrogen generator is used. For example, if the thickness of a pellet will increase as it reacts and the pellets in the stacked are used from the bottom of the stack to the top, the spacing between primary coils can be increased based on the expected thickness increases so that the next pellet to be heated is properly aligned with the corresponding primary coil. Conversely, if the thickness of a pellet decreases as it reacts, the spacing between primary coils can be decreased so the next pellet will be properly aligned with the primary coil.

A control system can be part of or be used in conjunction with the hydrogen generator or the system. The control system can be used to control the release of hydrogen, such as to provide hydrogen gas as needed. This can be determined based on one or more criteria, such as pressure (e.g., internal pressure or a differential between an internal and an external pressure); temperature (e.g., hydrogen generator, fuel cell or device temperature); a fuel cell electrical condition (e.g., voltage, current or power); or a device criterion (e.g., internal battery condition, power input, or operating mode. The control system can include one or more monitors for monitoring one or more of these criteria. The control system can be used for other purposes. For example, it can be used to determine the quantity of fuel remaining in the cartridge and provide related information to the user. It can be used to halt the release of hydrogen gas to avoid unsafe conditions. It can be used to monitor or verify information regarding the installed cartridge (e.g., to confirm that it is the correct type of cartridge, has sufficient fuel remaining, and so on). It can provide one or two-way communication among components of the fuel cell system and/or a device including the fuel cell system. The control system can be completely or partially disposed in the hydrogen generator, a fuel cell battery, a fuel cell system, a device being powered by the fuel cell system, or any combination thereof. The control system can include a microprocessor or micro controller; digital, analog and/or hybrid circuitry; solid state and/or electromechanical switching devices; capacitors; sensing instrumentation; and so on.

The cartridge can include hydrogen flow path, such as one or more channels extending through or around the pellet layers. For example, the flow path can have a central channel, and/or one or more channels can be disposed between the pellets and the casing. The hydrogen generator can include one or more filters and/or purification units to remove undesired reaction byproducts and other contaminants from the hydrogen gas. The filter(s) and purification unit(s) can be disposed in the hydrogen flow path.

The hydrogen generator can also include various fittings, valves and electrical connections for providing hydrogen to and interfacing with a fuel cell battery and/or an electrical appliance being provided with power by the fuel cell system. For example, the hydrogen outlet valve in the cartridge casing can cooperate with the hydrogen outlet through the compartment housing so hydrogen gas can be released. The hydrogen outlet through the housing can be an opening through which the hydrogen outlet valve can extend, or the a connector from another component of the system can extend through the opening to couple with the hydrogen outlet valve. Alternatively, the hydrogen outlet can include a connector that couples with the hydrogen outlet valve.

The hydrogen generator can include various safety features such as a pressure relief vent to release excessive pressure and a mechanism to stop the induction heating system if the internal temperature or pressure exceeds an established limit.

To help maintain a tight seal before use and to indicate an unused cartridge, a seal, such as a foil seal, can be placed over the hydrogen outlet valve. The foil seal can be removed before inserting the cartridge into the compartment, or the seal can be broken by inserting the cartridge into the compartment. Alternatively, the cartridge can be packaged in a hermetically sealed container and removed before use.

FIG. 1 shows a cross section of a portion of a hydrogen generator cartridge 100. The cartridge 100 has a casing that includes an electrically nonconductive can-shaped container 102 with a side wall 104, an integral bottom wall 106 and a lid 108 sealing the open end of the container 102. The container 102 can be lined with a thermal insulation liner 112 if the container is not sufficiently resistant to heat and/or is not sufficiently thermally insulating. The cartridge 100 contains a stack of pellets 120, each of which has a solid composition 122 that includes a hydrogen containing material. Within each pellet 120 is a secondary coil 124 of an induction heating system. The secondary coil 124 is in the form of a wire that is spot welded to form a loop. Thermal insulation discs 126 can be disposed between the pellets 120. Within the casing is a hydrogen path including one or more channels 128 through which hydrogen gas can flow to a hydrogen outlet valve 110 in the lid 108. The channels can extend through, around and/or between the pellets 120. Disposed in the hydrogen flow path can be one or more filters (not shown) to remove particulates from the hydrogen before the hydrogen reaches the hydrogen outlet valve 110. The particulates can include pieces of pellet solid composition 122 and solid reaction byproducts that are carried from the pellets 120 by the hydrogen gas. The filters can be disposed in a space 130 above the stack of pellets 120. Baffles and the like (not shown) can be included to guide the hydrogen gas to and through the filter(s). One or more purification units (not shown can also be included in the cartridge 100 (e.g., in the hydrogen flow path) or outside the cartridge 100. The purification unit(s) can be used to remove contaminants, such as gaseous byproducts, from the hydrogen gas. Also shown in FIG. 1, in plan view, is a primary coil 220 of the induction heating system. Only one primary coil 220 is shown as an example, but others can be included in the hydrogen generator as described above. The primary coil 220 is sized and positioned, within the hydrogen generator compartment so that it will induce current flow within one or inure secondary coils 124 to generate heat therein and heat the solid composition 122 of one or more pellets 120. Details of the primary coil 220 are not shown in FIG. 1, but it can be any of any suitable configuration, as described above.

Using an induction heating system as described above can have many advantages. Since no heat is generated outside the cartridge, the need for insulation around the hydrogen generator housing can be reduced. Response time to begin heating the pellets is reduced, since heat does not have to be transferred from a heating element outside the cartridge, and the cool down time may be faster, since there is no inventory of heat en route from an external heating element to the reaction zone. Since the cartridge casing is non-metallic, it stays cooler than a thermally conductive metal casing. By heating from the inside of the cartridge, less heat is lost to the environment, improving overall system efficiency. An induction heating system allows heat to be generated in the cartridge, but without the electrical connectors and gas-tight joints required for electrical wiring passing through the cartridge casing.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

What is claimed is:
1. A hydrogen generator comprising:
   a. a cartridge comprising:
      (1) a casing;
      (2) a plurality of solid pellets stacked within the casing, each pellet comprising at least one hydrogen containing material capable of releasing hydrogen gas when heated; and
      (3) a hydrogen outlet valve in the casing;
   b. a compartment comprising:
      (1) a housing;
      (2) a hydrogen outlet through the housing; and
      (3) a cavity within the housing within which the cartridge can be removably disposed; and
   c. an induction heating system comprising:
      (1) a plurality of electrically conductive secondary coils within the cartridge casing, with each secondary coil in contact with one or more of the pellets; and
      (2) at least one electrically conductive primary coil within the compartment housing;
   wherein the induction heating system is configured to receive an electric current from a power source, provide an electromagnetic field from a flow of the current in the at least one primary coil, induce an electric current in the at least one secondary coil, and provide heat from a flow of the induced electric current, thereby heating the pellets.

2. The hydrogen generator according to claim 1, wherein the pellets are arranged in multiple layers.

3. The hydrogen generator according to claim 2, wherein each layer contains only a single pellet of the plurality of solid pellets.

4. The hydrogen generator according to claim 1, wherein the induction heating system includes a moveable primary coil.

5. The hydrogen generator according to claim 1, wherein each pellet is in contact with a secondary coil.

6. The hydrogen generator according to claim 1, wherein at least one secondary coil is in contact with a pellet surface.

7. The hydrogen generator according to claim 1, wherein at least one secondary coil is disposed at least partially within a pellet.

8. The hydrogen generator according to claim 1, wherein the pellets are segregated pellets, with adjacent pellets separated from each other.

9. The hydrogen generator according to claim 8, wherein a thermally insulating material is disposed between adjacent pellets.

10. The hydrogen generator according to claim 1, wherein the cartridge comprises a sealed casing and a foil seal over a hydrogen outlet valve.

11. The hydrogen generator according to claim 10, wherein the foil seal is broken upon insertion of the cartridge into the compartment.

12. The hydrogen generator according to claim 1, wherein the hydrogen generator uses no liquid reactants.

13. The hydrogen generator according to claim 1, wherein the cartridge includes no catalyst.

14. The hydrogen generator according to claim 1, wherein the at least one hydrogen containing material, undergoes a thermal decomposition when heated to at least a minimum temperature, thereby producing hydrogen gas.

15. The hydrogen generator according to claim 1, wherein the at least one hydrogen containing material includes a member selected from the group consisting of a material that is configured to absorb and desorb hydrogen and a material that is configured to react to produce hydrogen gas upon thermal decomposition.

16. The hydrogen generator according to claim 1, wherein the pellets further include an ignition material capable of reacting exothermically selected from the group consisting of metal/metal oxide multilayers, a metal/metal multilayered thin film, an autoignition composition, a gel of a metal and water, and a gel of metal and water in combination with sodium borohydride.

17. A fuel cell system comprising:
 a fuel cell battery; and
 the hydrogen generator of claim 1.

18. The fuel cell system according to claim 17, wherein a portion of the induction heating system is in the fuel cell system outside the hydrogen generator.

19. The fuel cell system according to claim 17, wherein the induction heating system is configured to monitor at least one of temperature and pressure and selectively heat one or more pellets to provide hydrogen as needed by the fuel cell battery.

* * * * *